United States Patent [19]

Ha et al.

[11] 3,818,297

[45] June 18, 1974

[54] MOTOR CONTROL APPARATUS

[75] Inventors: In W. Ha, San Jose; Frank J. Sordello, Los Gatos, both of Calif.

[73] Assignee: Xerox Corporation, Stamford, Conn.

[22] Filed: Feb. 2, 1973

[21] Appl. No.: 329,055

[52] U.S. Cl. .............................................. 318/331
[51] Int. Cl. ............................................. H02p 5/16
[58] Field of Search ..................... 318/331, 332, 345

[56] References Cited
UNITED STATES PATENTS

| | | | |
|---|---|---|---|
| 3,436,636 | 4/1969 | James | 318/331 |
| 3,588,654 | 6/1971 | Balazs | 318/331 |
| 3,621,355 | 11/1971 | Dinger | 318/345 |
| 3,683,253 | 8/1972 | Rummel | 318/331 |
| 3,708,737 | 1/1973 | Johnson | 318/331 |

Primary Examiner—Robert K. Schaefer
Assistant Examiner—Thomas Langer
Attorney, Agent, or Firm—Marn & Jangarathis; James J. Ralabate

[57] ABSTRACT

Motor control apparatus is provided in accordance with the teachings of the present invention wherein a motor control signal proportional to the difference between desired motor speed and actual motor speed is supplied to the motor. Interrupting means is provided to periodically interrupt the supply of said control signal to said motor whereby an IR voltage drop attributed to the current effectively stored in the motor windings, a —L di/dt voltage component responsive to the interruption of said control signal and a back EMF component responsive to the inertial operation of said motor are induced in the motor. Forced relaxation means is coupled to the motor for decreasing the effective relaxation time thereof to dissipate the IR voltage drop and —L di/dt voltage component at a rate that exceeds the intrinsic rate of decay of the motor. Once the IR voltage drop and —L di/dt voltage component are sufficiently dissipated, the back EMF component induced in the motor is sampled, which back EMF component is representative of actual motor speed.

23 Claims, 3 Drawing Figures

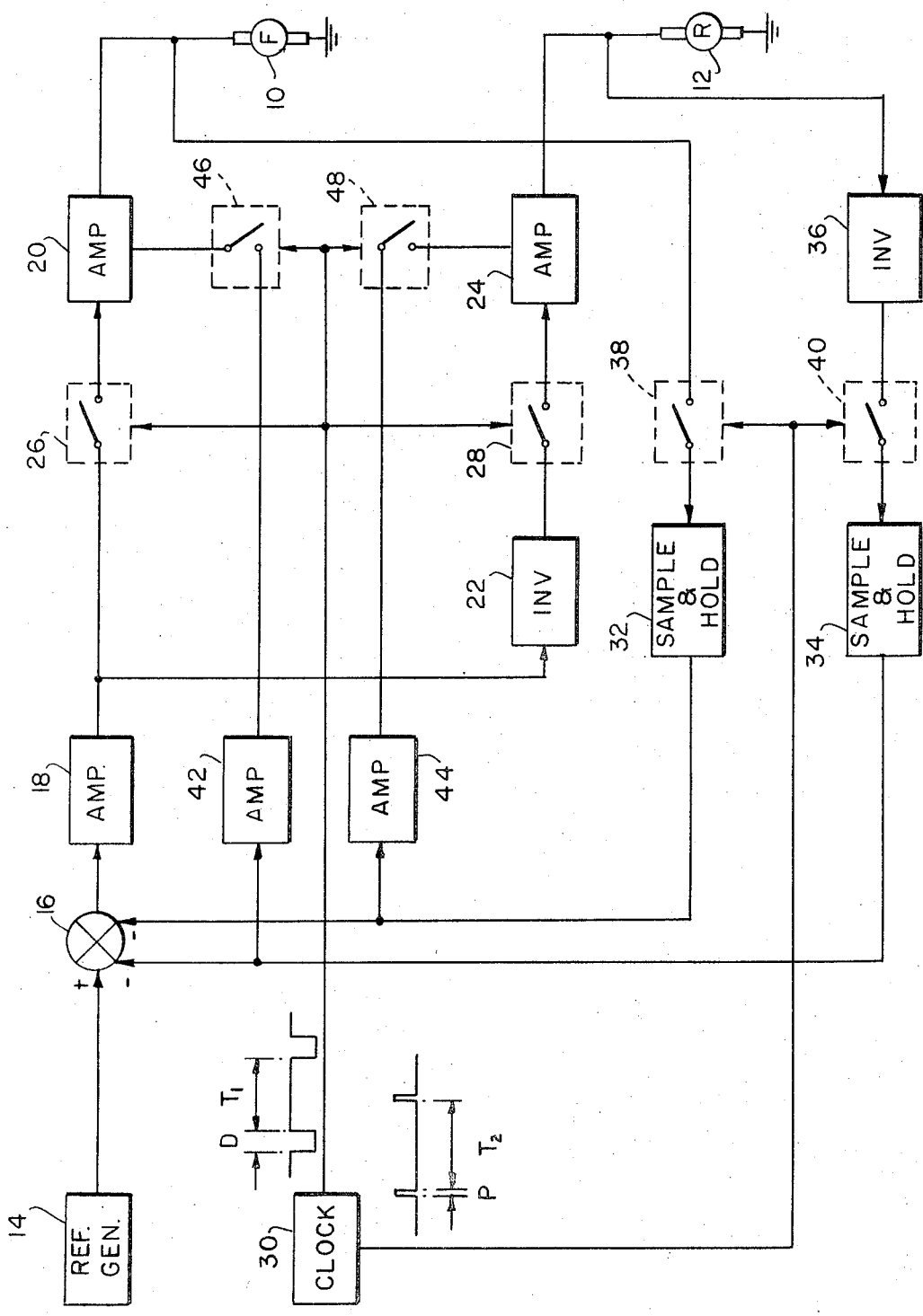

PATENTED JUN 18 1974 3,818,297

MOTOR CONTROL APPARATUS

This invention relates to motor control techniques and in particular, to a method of and apparatus for accurately sensing the back EMF component induced in a motor, said back EMF component being representative of actual motor speed.

BACKGROUND OF THE INVENTION

Many prior applications that employ electric motors to execute specific functions require accurate regulation of the operation of such electric motors. Present technology has achieved satisfactory motor regulation by employing several systems to effectively control motor speed. Generally, such several systems provide a reference signal representative of desired motor speed to which is compared a feedback signal representative of actual motor speed. Thus, the difference between desirable speed and actual speed is utilized to generate an error correcting signal adapted to be supplied to the motor to effect a correction in the speed thereof such that actual motor speed attains the desirable speed.

It is manifest that, in the design of motor control systems of the foregoing type, actual motor speed must be measured with precision. Accordingly, various devices have been proposed and are now commercially available to provide such accurate measurement. Thus, a conventional tachometer, which is a voltage generator adapted to generate a voltage having an amplitude proportional to the rotational velocity of the armature thereof, may be coupled to and thus driven by the controlled motor. Motor speed is thus represented by the voltage generated by the tachometer. An alternative type of speed measuring device contemplates the use of a reference member mounted on the movable shaft of the motor, which reference members acts in cooperation with a pick-up transducer to generate a series of pulses. The reference member may be comprised of, for example, a slotted disk, one or more spaced magnetic elements, or the like. The cooperating pick-up transducer may comprise a photosensor, a magnetic sensor, or the like. As the motor operates, the reference member rotates in synchronism with the rotating motor shaft thus causing the pick-up transducer to generate a series of pulses having a frequency directly proportional to motor speed.

The foregoing prior art motor speed measuring devices generally admit of moderate cost and have been readily employed in conventional motor control systems. However, as is readily understood, the operation of these devices requires mechanical coupling thereof to the rotatable shaft, or armature, of the controlled motor. The additional mass that must now be rotated, and the resulting inertia thereof, do, in many applications, significantly affect the design and operation of the motor control system. A substantial number of applications are adversely affected by such increase in mass. For example, in information processing and retrieval systems wherein motors are employed to drive a tape or film upon which information is recorded and/or retrieved, such tape or film must be rapidly and bidirectionally transported and is subjected to high accelerations caused by abrupt starting and stopping motion as well as abrupt changes in speed. The additional load presented to the controlled motor by, for example, a tachometer, seriously affects the rate at which motor operation may be initiated, terminated, or reversed. The additional load necessitates the application of correspondingly additional energy to effect sudden changes in motor operation. In, for example, tape drive systems wherein motors are employed to directly drive recording tape between a supply reel and a take up reel, and wherein a tape drive capstan is eliminated, the precision that is often required to regulate the drive motors might not be facilely achieved if said motors are subjected to the additional load of a coupled tachometer. Moreover, in many environments within which motors and the control systems therefor are employed, space limitations dictate that speed measuring devices must be compact and rugged without sacrificing accuracy.

To solve the foregoing problems, it has been proposed to eliminate the tachometer and other speed measuring devices that require a mechanical coupling to the motor armature and to electronically measure speed by measuring the back EMF induced in a rotating motor. Those of ordinary skill in the electric motor art recognize that as the armature of a motor rotates through the magnetic flux generated by the field windings, a voltage is induced across the armature. This induced voltage tends to oppose the voltage supplied to the motor armature and, therefore, is commonly known as the back EMF. The induced back EMF is a function of the angular velocity of the motor armature and, therefore, a measurement of the back EMF is an accurate measurement of motor speed. It is, of course, apparent that the back EMF induces across the armature is superimposed on the operating energy supplied thereto. Hence, accurate detection, and therefore measurement, of the back EMF is not readily implemented when the motor is supplied with operating energy.

In an attempt to accurately detect the back EMF induced across the rotating armature of a motor, it has been proposed to periodically interrupt the supply of operating energy to the motor and to measure the voltage appearing across the armature during such intervals of interruption. This technique proceeds upon the theory that the only voltage provided across the armature during an interval when operating energy is not supplied thereto must be the back EMF voltage induced thereacross in response to the inertial operation thereof. Of course, since the load on the motor together with frictional forces and other forces exerted thereon tend to decrease the motor speed during those intervals when operating energy is not supplied thereto, the interruption interval must be relatively small in comparison to the interval during which operating energy is supplied.

It has been found that when the supply of energy to the motor is interrupted, the energy stored in the motor windings, and thus the current flowing through the motor armature, decays exponentially to zero. This change in current flow generates a large voltage component proportional to the inductance of the motor armature and the rate of decay of current, and is known as the so-called inductive "kick". More particularly, this large voltage component is equal to $-L\, di/dt$ and is sufficiently high to present a potential hazard to the solid-state control circuitry coupled to the motor. Additionally, the exponentially decaying energy that had been stored in the motor windings now causes current to flow through the resistance of such windings, thus producing a slowly dissipating voltage. Moreover, if the voltage appearing across the armature is measured immediately after interrupting the supply of energy to the motor, the measured voltage would include a back EMF component as well as a residual IR voltage drop attributed to the current that had effectively been stored in the motor windings at the time of interrupting the supply of energy, and an inductive kick component. Hence, the measured voltage would not, at this time, be representative of the actual motor speed. One prior art solution to the undesirable effect upon back EMF caused by the residual IR voltage drop and inductive kick component contemplates an overload protecting circuit coupled to the motor and introduces a delay in measuring the back EMF component until after said inductive kick component has dissipated. An attendant disadvantage in providing such delay is that the relaxation time, or time constant required for the inductive kick component to dissipate to an insignificant value, is determined by the L/R time constant of the motor armature windings. The resistance of the armature winding of a preferred motor is relatively small, thereby defining a large time constant. Hence, the intrinsic rate at which the IR voltage drop and the induced inductive kick component decays is undesirably slow. Moreover, a delay of approximately 5 to 10 L/R time constants is usually required to enable the IR voltage drop inductive kick component to dissipate to a value that does not interfere with the measurement of the induced back EMF component.

An alternative solution to the problem of measuring the back EMF component induced in a motor armature in the absence of the IR voltage drop and inductive kick component contemplates a temporary decrease in the L/R time constant exhibited by the armature windings. More particularly, during each interval of interruption a high resistance element is connected in series with the armature winding to thereby provide a high impedance current path for the rapidly decaying current flow. The effective increase in the time constant of the armature winding during the interruption interval causes a rapid exponential decay in the armature current. However, the addition of a high resistance element to the armature presents an electrical load to the induced back EMF component whereby the measured voltage might not be an accurate representation of actual motor speed. A still further proposed solution to the problems caused by the IR voltage drop and inductive kick component assures that the armature current is not provided with a flow path during the interruption interval. Solid state switching devices, such as control rectifiers or the like, are disposed in the armature current path and assume a current blocking condition during those intervals that operating energy is not supplied to the armature. It is thought that the rapid decay of the armature current results in a rapid decrease in the IR voltage drop and −L di/dt voltage component. However, it has been found that if the armature current is rapidly minimized then di/dt admits of a large magnitude. Consequently, −L di/dt is large and the high relaxation time of the armature windings required to dissipate the −L di/dt voltage component impedes the rapid dissipation of such component. Furthermore, a protective circuit is required to prevent damage to the motor control circuitry caused by the large −L di/dt component. Such protective circuit has heretofore embodied a particularly poled diode that is back biased during the supply of energy to the motor and provides a discharge path for the IR voltage drop and inductive kick component during intervals of energy interruption. Such diode configuration has been designated a "free-wheeling" diode. However the use of a "free-wheeling" diode does not mitigate the problem of accurately measuring the back EMF component. Hence, a measurement of the armature voltage during the interruption interval would include a representation of the inductive kick component and residual IR component, and would not accurately represent the actual motor speed. Thus, employing a "free-wheeling" diode and assuring that the armature current exponentially decays to a zero value do not alter the effective relaxation time of the armature windings and, therefore, do not negate the deleterious influence caused by the IR voltage drop and inductive kick component upon the measurement of the back EMF component.

OBJECTS OF THE INVENTION

Therefore, it is an object of the present invention to provide motor control apparatus for regulating the speed of an electric motor without employing a mechanically coupled speed measuring device.

Another object of the instant invention is to provide a method of and apparatus for measuring the speed of an electric motor by periodically sampling the back EMF induced therein.

Yet another object of the present invention is to provide a method of and apparatus for forcing the −L di/dt voltage component induced in the armature of an electric motor in response to an interruption of energy supplied to said motor to decrease at a rate that exceeds the rate of decay intrinsic to said armature and heretofore obtainable with a "free-wheeling" diode.

Still another object of the present invention is to provide a method of and apparatus for decreasing the effective relaxation time of the armature of an electric motor to dissipate the stored energy IR voltage drop and the inductive kick component induced in said armature in response to the interruption of operating energy supplied to the motor at a rate that exceeds the intrinsic rate of decay of said armature and heretofore obtainable.

It is an additional object of the instant invention to provide motor regulating apparatus wherein a reference signal representative of desired motor speed is compared to a signal representative of actual motor speed, said last mentioned signal being derived from the back EMF induced in the motor armature responsive to the inertial operation of said motor.

A still further object of the present invention is to provide apparatus for sampling the back EMF component induced across a motor to thereby measure the operating speed of said motor.

Another object of this invention is to provide motor control apparatus including forced relaxation amplifying means adapted to operate in a first mode for applying an amplified control signal to an electric motor and to operate in a second mode for decreasing the effective relaxation time of said motor to dissipate the stored energy IR voltage drop and the −L di/dt voltage component induced in response to the interruption of said control signal at a rate that exceeds the intrinsic rate of decay of said motor to thereby permit an accurate sampling of the back EMF induced across said motor.

Various other objects and advantages of the present invention will become clear from the following detailed description of an exemplary embodiment thereof, and the novel features will be particularly pointed out in connection with the appended claims.

SUMMARY OF THE INVENTION

In accordance with this invention, an improved regulating system for an electric motor is provided wherein a control signal is derived in response to the difference between a signal representative of desired motor speed and a signal representative of actual motor speed, said regulating system includes interrupting means for periodically interrupting the application of said control signal to said motor whereby an IR voltage drop attributed to the current that had been effectively stored in the motor windings, a −L di/dt voltage component responsive to the interruption of said control signal and a back EMF component responsive to the inertial operation of said motor are induced in the motor; means coupled to the motor for decreasing the effective relaxation time thereof to dissipate the IR voltage drop and the −L di/dt voltage component at a rate that exceeds the intrinsic rate of decay of the motor heretofore obtainable; and sampling means coupled to the motor for sampling during each interval of interruption and subsequent to the substantial dissipation of the IR voltage drop and the −L di/dt voltage component the back EMF component, said back EMF component being directly proportional to the actual speed of the motor.

BRIEF DESCRIPTION OF THE DRAWINGS

The invention will be more clearly understood by reference to the following detailed description of exemplary embodiments thereof in conjunction with the accompanying drawings in which:

FIG. 1 is a block diagram of a motor regulating system wherein the instant invention finds ready application;

DETAILED DESCRIPTION OF THE INVENTION

Motor Control System

Figure 3:
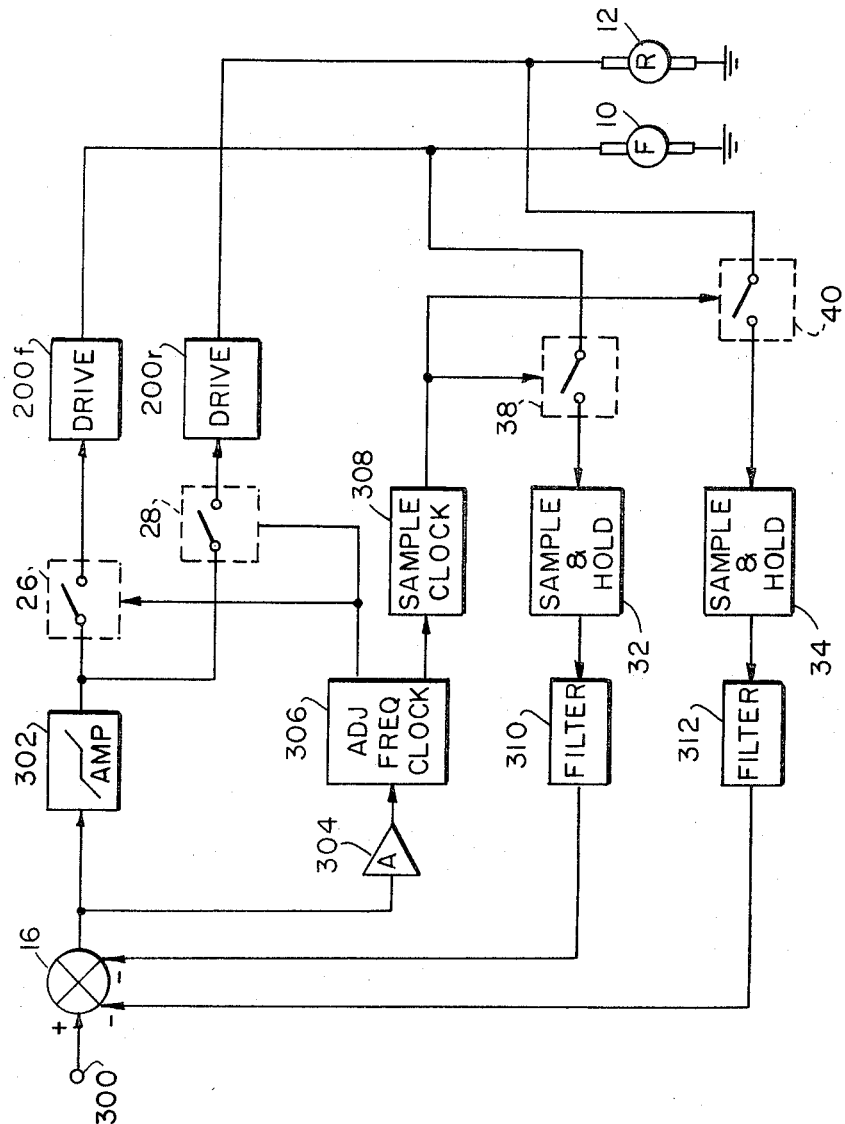
FIG. 3 is a block diagram of an improved motor control system in accordance with the present invention.

Referring now to the drawings wherein like reference numerals are used throughout and in particular to FIG. 1, there is illustrated a block diagram of a motor control system for regulating the speed of an electric motor and comprises motor 10, reference means 14, error signal generating means 16, amplifying means 18, and sample and hold means 32. The motor 10 may comprise a conventional DC electric motor having a rotatable armature to which operating energy is applied. The angular velocity of the armature of motor 10 is a function of the magnitude of energy supplied thereto. Additionally, the direction of rotation of the armature of motor 10 is a function of the polarity of the energy supplied thereto. Thus, for example, a reversal in the operation of the motor may be effected by reversing the polarity of the energy applied thereto.

Although the illustrated motor control system may be advantageously employed to regulate the operation of a single motor capable of driving any suitable motor driven device, such system will here be described in the environment of a recording tape drive system wherein an information recording tape, such as magnetic tape, paper tape or the like, is bi-directionally transported from a supply reel to a take up reel. Thus, illustrated motor 10 may be differentially coupled through suitable mechanical coupling devices to the supply reel and to the take up reel and operable to selectively drive one or the other of such reels to determine the direction and speed of transported tape. Thus, motor 10 may be operable to rotate in a first direction to drive the tape take up reel such that the tape is transported from the supply reel through a conventional processing station to the driven take up reel. A reversal in the operation of motor 10 may cause the motor to drive the supply reel such that tape is transported from the take up reel to said supply reel. In a preferred tape drive system with which the illustrated motor control system finds ready application, it is contemplated that individual motors be employed for transporting the tape in forward and reverse directions, i.e., from the supply reel to the take up reel and from the take up reel to the supply reel. Thus, FIG. 1 depicts a motor control system for regulating the speed of forward drive motor 10 and reverse drive motor 12, which motors are preferably employed in a direct drive reel-to-reel tape transport system, thereby obviating the heretofor required capstan drive. Reverse drive motor 12 comprises a DC motor including a rotatable armature similar to the forward drive motor 10. In the illustrated tape drive system, forward drive motor 10 is adapted to be supplied with unidirectional DC energy, such as direct current. The armature of forward drive motor 10 is thus capable of being electromagnetically driven in the forward direction, for example, whereby tape is transported from the supply reel to the take up reel. Similarly, reverse drive motor 12 is adapted to be supplied with unidirectional DC energy such as direct current, whereby the armature thereof is capable of being electromagnetically driven in a reverse direction, for example, such that tape is transported from the take up reel to the supply reel. Hence, when tape is to be transported in a forward direction, forward drive motor 10 is supplied with DC energy to drive the tape accordingly. At this time reverse motor 12 is not supplied with DC energy and the armature of the reverse motor, which is mechanically coupled to the supply reel, for example, rotates in response to the paying out of tape from the supply reel to the take up reel. Conversely, when tape is to be transported in the reverse direction, reverse drive motor 12 is supplied with DC energy to drive the supply reel accordingly. At this time, forward drive motor 10 is not supplied with DC energy and the armature thereof, which is mechanically coupled to the take up reel, for example, rotates in response to the paying out of tape from the take up reel to the supply reel. As illustrated, an input to the armature of each of forward drive motor 10 and reverse drive motor 12 is coupled to ground.

Reference generating means 14 is adapted to supply a DC reference signal admitting of a magnitude representing a desired motor speed and of a polarity representing a desired direction of tape transport. For example, a reference signal admitting of positive polarity may be assumed to represent forward tape drive such that forward drive motor 10 is supplied with DC energy. Conversely, a reference signal admitting of negative polarity may be assumed to represent reverse tape drive whereby reverse drive motor 12 is supplied with DC energy. Of course, it is appreciated that the foregoing assumptions of polarity are not intended to be limiting and the reference signal may admit of any polarity desired to represent the particular directions of tape transportation. The magnitude of the reference signal produced by reference generating means 14 may be derived from suitable switching signals that are manually or automatically generated. Thus, if the tape transport system is operable under operator control, manually operable switches, not shown, may be provided to effect rapid, slow, or intermediate tape transport speeds as well as forward or reverse transport directions. Alternatively, if the tape transport system is subject to machine control, for example an electronic digital computer or the like, appropriate logic signals may be provided to command rapid, slow or intermediate tape transport rates as well as forward or reverse transport directions. Reference generating means 14 may include a conventional logic gating network responsive to the manually operable switches or machine generated logic signals to produce a reference signal of proper magnitude and polarity.

Error signal generating means 16 is coupled to reference means 14 and to sample and hold networks 32 and 34, respectively. The error signal generating means is adapted to generate an output signal, hereafter an error signal, proportional to the difference between the input signal and the feedback signals applied thereto. Error signal generating means 16 may thus comprise a conventional differencing or subtracting circuit such as a conventional differential amplifier, an algebraic resistance combining network, an operational amplifying circuit or the like.

Error signal generating means 16 is coupled to amplifying means 18, the latter amplifying means being adapted to apply operating energy to either forward drive motor 10 or reverse drive motor 12. Amplifying means 18 may comprise a conventional amplifying circuit responsive to the error signal to thereby supply forward drive motor 10 or reverse drive motor 12 with sufficient operating energy compatible therewith. The output of amplifying means 18 is supplied to forward drive motor 10 by amplifying means 20. Amplifying means 20 may comprise a motor driving circuit coupled to the armature of forward drive motor 10 to supply the armature windings with energizing current proportional to the amplified output of amplifying means 18. More particularly, amplifying means 20 is adapted to respond to a unidirectional signal supplied thereto by amplifying means 18. For the purpose of the present description, amplifying means 20 may be assumed to respond to a positive signal, such as a positive DC signal, to supply positive energizing current, e.g. direct current, to forward drive motor 10. It is of course, understood that amplifying means 20 may be responsive to a negative signal. Additionally, the output of amplifying means 18 is coupled to the armature windings of reverse drive motor 12 via the series connection of inverting means 22 and amplifying means 24. Amplifying means 24 may be similar to aforementioned amplifying means 20. Inverting means 22 is adapted to reverse the polarity of a signal supplied thereto such that a positive signal is supplied to amplifying means 24 in response to a negative signal provided by amplifying means 18. Conversely, a negative signal is applied to amplifying means 24 in response to a positive signal provided by amplifying means 18. Hence, inverting means 22 may comprise a conventional unity gain inverting amplifier, such as an operational amplifier, or other conventional polarity negation circuit.

As illustrated in FIG. 1, interrupting means are provided in the series circuits extending between amplifying means 18 and forward drive motor 10 and reverse drive motor 12, respectively. The interrupting means perform a function subsequently described and may be comprised of conventional switching devices such as FET switches, transistor switches, electromechanical switches, or the like. The interrupting means are here depicted as switch means 26 interposed between amplifying means 18 and amplifying means 20, and switch means 28 interposed between inverting means 22 and amplifying means 24. Alternatively, switch means 28 may be positioned to couple amplifying means 18 to inverting means 22. The switch means 26 and 28 include control input terminals coupled in common relationship to clock means 30 and are operable at an interrupting frequency. Clock means 30 is adapted to generate periodic pulses having a duration D and a repetition period $T_1$ and exhibiting a relatively small duty cycle. The clock means may thus comprise a conventional oscillator such as an astable multivibrator, or the like, conventionally employed to function as a timing circuit. Such clock means are well known to those of ordinary skill in the art. For the purpose of the present description, the pulses produced by clock means 30 and applied to switch means 26 and 28 may be negatively poled pulses which periodically interrupt a constant positive voltage level. Switch means 26 and 28 are each capable of assuming a first, or closed state in response to the positive voltage level applied thereto by clock means 30. The switch means are deactivated to thereby assume their respective second, or opened, states in response to the negatively poled pulses of duration D generated by clock means 30. Since the pulse duration D is much less than the repetition period $T_1$, it is recognized that switch means 26 and 28 function to periodically interrupt the series connection between amplifying means 18 and amplifying means 20 as well as the series connection between amplifying means 18 and amplifying means 24.

Sample and hold means 32 is coupled to the armature of forward drive motor 10 via switch means 38. The sample and hold means is adapted to sample the back EMF induced in forward drive motor 10 when copuled thereto via switch means 38. Similarly, sample and hold means 34 is coupled to the armature of reverse drive motor 12 by switch means 40 and inverting means 36 to sample the back EMF induced in the armature of motor 12. Sample and hold means 32 and 34 are similar and each may comprise a conventional sampling gate coupled to a storage capacitor. Activation of the sampling gate permits the voltage coupled thereto to be applied to the storage capacitor. The voltage thus applied to the storage capacitor is maintained thereon until a subsequent activation of the sampling gate. Switch means 38 may be similar to aforedescribed switch means 26 and is adapted when energized to interconnect sample and hold means 32 to forward drive motor 10. Accordingly, switch means 38 includes a control input terminal coupled to clock means 30. A periodic energizing signal is capable of being supplied to the control input terminal of switch means 38 by clock means 30. The periodic energizing signal may comprise a train of positively poled pulses having a repetition period $T_2$ and a pulse duration P, and exhibiting a relatively small duty cycle. It may be assumed, for the present discussion, that pulse duration P is less than the aforedescribed pulse duration D. Switch means 40 is similar to switch means 38 and includes a control input terminal coupled to clock means 30 in common relationship with the control input terminal of switch means 38.

Inverting means 36 is similar to aforedescribed inverting means 22 and is adapted to invert the polarity of the voltage applied thereto by reverse drive motor 12. It will soon be understood that inverting means 36 provides sample and hold means 34 with a voltage exhibiting a polarity identical to the polarity of the voltage applied to sample and hold means 32. More particularly, it may be appreciated that if forward drive motor 10 is energized so as to rotate in a first, or forward direction, such as a counterclockwise direction, such first direction may be considered a positive direction whereby the back EMF induced thereacross admits of a corresponding first polarity. It will here be assumed that the polarity of the back EMF induced across forward drive motor 10 when said motor is driven in a forward direction is positive. Nevertheless, it should be recognized that this designation of the polarity of the back EMF induced across forward drive motor 10 is not intended to be limiting. Thus, if desired, the back EMF may exhibit a negative polarity when forward drive motor 10 is driven in its forward direction. It is appreciated that when forward drive motor 10 is driven in its forward direction, the armature of reverse drive motor 12 rotates in a similar direction, such as the counterclockwise direction. Although this direction may be considered the forward direction for the transport of tape, it is opposite to the normal rotation assumed by the armature of the reverse drive motor when said reverse drive motor is positively energized. Hence, the back EMF induced across reverse drive motor 12 when said reverse drive motor rotates in the counterclockwise direction, for example, is opposite in polarity to that of the back EMF induced across forward drive motor 10. Hence, inverting means 36 is provided to invert the polarity of the back EMF induced across reverse drive motor 12 such that the polarity of the voltage applied to sample and hold means 34 is now identical to the polarity of the voltage applied to sample and hold means 32. Similarly, when reverse drive motor 12 is positively energized to thus reverse the direction in which tape is transported, it is appreciated that the armature thereof now rotates in a second, or clockwise direction. The armature of forward drive motor 10 likewise rotates in the clockwise direction. This direction of armature rotation results in, for example, a back EMF induced across reverse drive motor 12 admitting of a positive polarity. However, the back EMF now induced across the armature of forward drive motor 10 admits of a negative polarity. Consequently, inverting means 36 serves to reverse the polarity of the back EMF induced across reverse drive motor 12 to thereby provide sample and hold means 34 with a voltage having a polarity identical to the polarity of the voltage now applied to sample and hold means 32. It should be readily apparent that, if desired, inverting means 36 may alternatively be provided at the input to sample and hold means 32 or at the output of either sample and hold means 32 or sample and hold means 34.

It is recalled that the outputs of sample and hold means 32 and 34 are fed back to error signal generating means 16. In addition, sample and hold means 32 is coupled to amplifying means 44 and sample and hold means 34 is coupled to amplifying means 42. The outputs of amplifying means 42 and 44 are coupled to amplifying means 20 and 24, respectively, via switch means 46 and 48. Amplifying means 42 and 44 are utilized to maintain substantially constant tension in the tape that is transported by the apparatus of the illustrated system. Further description of amplifying means 42 and 44 and the manner in which substantially constant tape tension is maintained is provided in detail in copending U.S. Pat. application Ser. No. 329,054 filed on Feb. 2, 1973, and assigned to Xerox Corporation, the assignee of the present invention. Switch means 46 and 48 are similar to aforedescribed switch means 26 and 28 and include control input terminals connected in common relationship to the control input terminals of the aforedescribed switch means and, consequently, to clock means 30.

The operation of the motor control apparatus illustrated in FIG. 1 will now be described. Let it initially be assumed that the transported tape is to be driven in a first, or forward, direction. Accordingly, reference generating means 14 produces a positive DC signal admitting of a predetermined magnitude. It is recalled that this positive DC signal may be derived from the operation of manually operable switches or logic command signals. If forward drive motor 10 and reverse drive motor 12 are initially at rest, the voltages stored in sample and hold means 32 and 34 and supplied to error signal generating means 16 are essentially zero. Accordingly, error signal generating means 16 is provided with the positive DC signal supplied thereto by reference generating means 14. The difference between the signal supplied by reference generating means 14 and sample and hold means 32 and 34, i.e., the error signal, is recognized as being essentially the positive DC signal produced by the reference generating means. The positive DC error signal is amplified by amplifying means 18 and applied via switch means 26 to amplifying means 20 and through inverting means 22 and switch means 28 to amplifying means 24. It may be further assumed that switch means 26 and 28 assume their respective closed states to thus provide a continuous transmission channel to amplifying means 20 and 24, respectively, from amplifying means 18. Amplifying means 20 operates upon the amplified positive DC error signal supplied thereto by amplifying means 18 to generate a positive direct current of sufficient magnitude to energize forward drive motor 10. It may be appreciated that the energizing current now supplied to forward drive motor 10 by amplifying means 20 admits of a maximum amplitude. At this time, the amplified positive DC error signal produced by amplifying means 18 is inverted in polarity by the inverting means 22 to supply amplifying means 24 with an amplified negative DC signal. It is recalled that amplifying means 20 and 24 are each responsive to a unidirectional signal supplied thereto which signal, for the purpose of the instant discussion, has been assumed to exhibit a positive polarity. Consequently, amplifying means 24 is not responsive to the amplified negative DC signal supplied thereto by inverting means 22 and, therefore, does not supply an energizing current to reverse drive motor 12. The supply of positive energizing current to forward drive motor 10 initiates the operation of the forward drive motor resulting in the rotation of the armature thereof. As the forward drive motor is energized, the angular velocity thereof is increased and tape is transported in the forward direction. As tape is paid out from the supply reel to the take up reel, the armature of reverse drive motor 12, which is mechanically coupled to the supply reel, is rotated in a corresponding direction, which direction is opposite to that normally rotated when said reverse drive motor 12 is energized.

While forward drive motor 10 is energized, clock means 30 operates to supply periodic negatively poled pulses to switch means 26 and 28. It is appreciated that as each pulse of operation D is applied to the switch means, the continuous transmission channel extending between amplifying means 18 and amplifying means 20 as well as the continuous transmission channel extending from amplifying means 18 to amplifying means 24 is interrupted. The period of interruption is, of course, substantially equal to the pulse duration D. The deactivation of switch means 28 in response to the negatively poled pulse of duration D applied thereto has no appreciable effect upon amplifying means 24 inasmuch as the amplifying means does not respond to the amplified negative DC signal now supplied thereto. However, the deactivation of switch means 26 interrupts the supply of the amplified positive DC signal to amplifying means 20 and, consequently, interrupts the positive DC energizing current heretofore supplied to forward drive motor 10. Nevertheless, in view of the inertia of the armature of the forward drive motor, said armature continues to rotate as a function of said inertia. The rotation of the armature windings through the magnetic field generated by the energized field windings of the forward drive motor 10 induces a back EMF across the armature. Additionally, a residual IR voltage drop attributed to the DC energizing current that had been stored in the armature windings, together with the inductive kick component equal to $-L\,di/dt$ are generated at the armature of the forward drive motor in response to the interruption in the supply of energizing current thereto. This IR voltage drop and inductive kick component are forced to decrease at a rate that exceeds the rate of decay intrinsic to the armature of the forward drive motor by means soon to be described. It will be seen that the IR voltage drop and inductive kick component are substantially dissipated during a first portion of the pulse duration D. Once the IR voltage drop and inductive kick component are so dissipated, it is appreciated that the voltage now provided at the armature of the forward drive motor is substantially equal to the back EMF induced thereacross.

The positively poled pulses applied to switch means 38 and 40 by clock means 30 are accurately synchronized with the negatively poled pulses generated by the clock means such that each positively poled pulse of duration P occurs during a relatively small terminating portion of pulse duration D. Moreover, duration P is here selected to be less than the duration D and, for example, may be 10 percent of said duration D. Switch means 38 and 40 respond to the clock pulses applied thereto to assume their respective closed states thereby providing continuous transmission channels between forward drive motor 10 and sample and hold means 32 and between reverse drive motor 12 and sample and hold means 34, respectively. Sample and hold means 32 is thus activated to sample the back EMF induced across forward drive motor 10 and supplied thereto by switch means 38. A voltage representing the actual angular velocity of forward drive motor 10 is thus stored in sample and hold means 32.

It is recognized that as tape is paid out from the supply reel to the take up reel, the armature of reverse drive motor 12 rotates through the magnetic flux generated by the energized field windings of the reverse drive motor. Consequently, a back EMF proportional to the angular velocity thereof is induced across the reverse drive motor. In accordance with the initially assumed parameters, positive energization of forward drive motor 10 results in a back EMF exhibiting positive polarity induced thereacross and a back EMF exhibiting negative polarity induced across the reverse drive motor 12. The negative polarity of the back EMF induced across the reverse drive motor 12 is inverted by inverting means 36 and then supplied by switch means 40 to sample and hold means 34. It is readily apparent that sample and hold means 32 and 34 now store voltages proportional to the angular velocities of forward drive motor 10 and reverse drive motor 12, respectively.

Error signal generating means 16 now generates an error signal proportional to the difference between the reference voltage applied thereto by reference generating means 14 and the sampled back EMF components fed back thereto by sample and hold means 32 and 34, respectively. Hence, the error signal applied to amplifying means 18 is indicative of the deviation between the actual velocity of the driven tape and the desired velocity thereof.

At the conclusion of pulse duration D, a positive energizing signal is applied to the control input terminals of switch means 26 and 28 by clock means 30. These switch means are now positively activated to reconnect amplifying means 20 to amplifying means 18 and to reconnect amplifying means 24 to amplifying means 18. If it is assumed that the driven tape has not yet attained the desired velocity thereof, it is manifest that the magnitude of the reference signal generated by reference generating means 14 exceeds the combined magnitudes of the sampled back EMF components stored in sample and hold means 32 and 34. Hence, the error signal is a positive DC signal. In accordance with the aforedescribed operation, amplifying means 20 responds to the amplified positive DC signal applied thereto to supply a positive energizing current to forward drive motor 10 admitting of a magnitude determinative of the operating speed of the motor. More particularly, since the actual velocity of the forward drive motor is now approaching the desired velocity thereof to thus drive the tape at the speed determined by the reference generating means 14, it is recognized that the magnitude of the energizing current supplied to the drive motor need not be as great as that of the energizing current previously supplied thereto. Nevertheless, since the energizing current is a direct function of the error signal produced by error signal generating means 16, the angular velocity of the forward drive motor is increased to further approach the desired angular velocity thereof and, consequently, to reduce the magnitude of the generated error signal.

During the next negatively poled pulse interval D, switch means 26 and 28 are interrupted to thus interrupt the energizing current supplied to forward drive motor 10. Subsequently, when the IR voltage drop and inductive kick component, induced across the forward drive motor in response to the interruption of the energizing current, have been dissipated, switch means 38 and 40 respond to the positively poled pulse of duration P to enable sample and hold means 32 and 34, respectively, to sample and store therein the respective back EMF components representing the angular velocities of the forward and reverse drive motors.

The foregoing operation is repeated until the tape is driven at a velocity corresponding to the desired velocity represented by the magnitude of the reference signal generated by reference generating means 14. When such desired velocity is actually attained, the error signal generated by error signal generating means 16 is reduced substantially to zero and amplifying means 20 supplies forward drive motor 10 with a positive DC energizing current admitting of a sufficient magnitude to maintain the forward drive motor at the proper angular velocity to drive the tape accordingly. It is apparent that if the energization of forward drive motor 10 results in a tape velocity that exceeds the desired velocity therefor as represented by the reference signal generated by reference generating means 14, the combined sampled back EMF components stored in sample and hold means 32 and 34 exceeds the magnitude of the reference signal. Hence, the resulting DC error signal admits of a negative polarity. Amplifying means 20 is thus supplied with an amplified DC error signal to which the amplifying means is not responsive. However, inverting means 22 serves to provide amplifying means 24 with an amplified positive DC error signal to which the latter amplifying means responds to apply a positive DC energizing current to reverse drive motor 12. It should be noted that, although the magnitude of the energizing current now supplied to reverse drive motor 12 is not sufficient to effect a reversal in the rotation of the armature thereof, such energizing current does act to oppose the rotation of the armature and thus to retard the velocity of the driven tape. The manner in which the illustrated apparatus accurately regulates the speed of transported tape to thus conform to a desired speed should now be readily apparent.

Although not described in detail herein, it is here noted that the purpose of amplifying means 44 is to supply reverse biasing current to reverse drive motor 12 when forward drive motor 10 is energized to thus maintain substantially constant tension in the tape transported from the supply reel to the take up reel. As is apparent from FIG. 1, the reverse biasing current is a function of the angular velocity of the forward drive motor. Similarly, amplifying means 42 serves to supply forward drive motor 10 with a reverse biasing current proportional to the angular velocity of the reverse drive motor 12 to maintain substantially constant tape tension when the reverse drive motor is energized. Since it is preferred to eliminate the supply of current to either forward drive motor 10 or reverse drive motor 12 during the aforedescribed periodic intervals of interruption, the transmission channel from amplifying means 42 to amplifying means 20 to forward drive motor 10 and the transmission channel from amplifying means 44 to amplifying means 24 to reverse drive motor 12 are likewise interrupted by the operation of switch means 46 and 48 in response to the negatively poled pulses generated by clock means 30. Further description of amplifying means 42 and 44 and the manner in which the operation of said amplifying means effects substantially constant tape tension is provided in detail in copending U.S. Pat. application Ser. No. 329,054 supra.

The foregoing explanation has described the operation of the illustrated apparatus when forward drive motor 10 is energized to drive the tape in a forward direction. The operation of the motor control apparatus to energize reverse drive motor 12 to thus drive the tape in a reverse direction is substantially similar. To effect a reverse drive of the tape, the polarity of the reference signal generated by reference generating means 14 is opposite to that of the reference signal when forward tape drive is desired. Hence, in accordance with the previously assumed examples, reference generating means 14 now generates a negative DC signal admitting of a magnitude representing the desired velocity of the tape. If motors 10 and 12 are initially at rest, error signal generating means 16 generates a negative DC error signal proportional to the reference signal magnitude. An amplified negative DC error signal is supplied by amplifying means 18 to amplifying means 20 via closed switch means 26 and to inverting means 22. Since amplifying means 20 is adapted to respond to a unidirectional signal applied thereto, which unidirectional signal has been heretofore assumed to be a positive signal, the amplifying means is now nonresponsive to the amplified error signal and does not supply positive DC energizing current to forward drive motor 10. However, it is apparent that the amplified negative DC error signal applied to inverting means 22 is inverted thereby to provide amplifying means 24 with an amplified positive DC signal. Consequently, amplifying means 24 is now capable of responding to the signal applied thereto to supply reverse drive motor 12 with a positive DC energizing current. The positive energization of reverse drive motor 12 effects a rotation thereof in a direction opposite to that previously described hereinabove. For example, the armature of the reverse drive motor may now rotate in a clockwise direction to effect a reversal in the direction in which the tape is now driven. If reverse drive motor 12 is coupled to the supply reel, tape is now paid out from the previously described take up reel and wound upon the driven supply reel. Consequently, the armature of forward drive motor 10 also experiences a reversal in the rotational direction thereof.

As is now understood, the continuous transmission channel between amplifying means 18 and amplifying means 20 as well as the continuous transmission channel between amplifying means 18 and amplifying means 24 is interrupted upon the occurence of a negatively poled pulse of duration D. Hence, when clock means 30 applies a negatively poled pulse to switch means 26 and 28, the respective switch means are deactivated and the energization of reverse drive motor 12 is now interrupted. The IR voltage drop and inductive kick component induced across reverse drive motor 12 in response to the interruption in the supply of energizing current thereto are rapidly dissipated in a manner soon to be described; and, subsequent to the dissipation of the IR voltage drop and inductive kick component, clock means 30 supplies a positively poled pulse of duration P to switch means 38 and 40. The resultant closing of switch means 38 and 40 enables sample and hold means 32 and 34, respectively, to sample the back EMF components induced across the armatures of the forward and reverse drive motors, respectively, and to store such sampled components. Since the armature of forward drive motor 10 is now rotating in a reversed direction, the polarity of the back EMF induced thereacross is assumed negative. Consequently, a negative voltage representing the actual angular velocity of forward drive motor 10 is now stored in sample and hold means 32. Also, since reverse drive motor 12 is now positively energized by the positive DC energizing current supplied thereto, the angular rotation thereof is effective to induce a positive back EMF component thereacross. The polarity of this induced back EMF component is inverted by inverting means 36 and, consequently, a negative voltage representing the actual angular velocity of reverse drive motor 12 is now stored in sample and hold means 34.

Error signal generating means 16 now compares the DC reference signal applied thereto by reference generating means 14 and the DC voltages fed back thereto by sample and hold means 32 and 34. Consequently, if the driven tape has not as yet attained the velocity represented by the reference signal generated by reference generating means 14, the error signal generating means supplies a negative DC error signal to amplifying means 18. Hence, the aforedescribed operaton of the illustrated apparatus is repeated until reverse drive motor 12 is supplied with sufficient DC energizing current to thus drive the tape at the speed selected by the reference signal.

Although the motor control apparatus illustrated in FIG. 1 has herein been described in the environment of a preferred application thereof, viz., a tape drive system, it is manifest that such control apparatus may be advantageously utilized to regulate the operation of a single electric motor or of plural electric motors. Furthermore, the polarities of the signals generated by reference generating means 14 as well as the polarities of the energizing currents supplied to forward and reverse drive motors 10 and 12, respectively, are understood to be merely exemplary. Consequently, forward tape drive may be initiated by a negative DC reference signal and reverse tape drive may be initiated by a positive DC reference signal. Alternatively, the selective transport of tape in the forward and reverse directions may be determined by selectively activating, or closing one of switch means 26 and 28 instead of being determined by the polarity of the reference signal. For example, if switch means 26 is closed, amplifying means 20 is activated to energize forward drive motor 10. Conversely, if switch means 28 is closed, amplifying means 24 is activated to energize reverse drive motor 12. In this mode of operation, the polarity of the reference signal generated by reference signal generating means 14 is not determinative of transport direction and, therefore, the reference signal may exhibit uniform polarity irrespective of desired direction. Similarly, the polarity of the voltages stored in sample and hold means 32 and 34, and representative of the actual angular velocities of motors 10 and 12, respectively, may exhibit uniform polarity notwithstanding the particular direction of rotation of the armatures of said motors. Similarly, amplifying means 20 and 24 may be responsive to negative signals supplied thereto to thus supply their respective drive motors with suitable DC energizing currents. Furthermore, each of the illustrated amplifying means may, if desired, be conventional inverting amplifiers to produce correspondingly poled amplified signals. Also, the back EMF components induced across the armatures of forward drive motor 10 and reverse drive motor 12, respectively, may exhibit polarities opposite to those described hereinabove. Moreover, the duration D of the negatively poled pulses produced by clock means 30 is adapted to be a relatively small portion of the repetition period T. An exemplary duration D may be 20 percent of the repetition period. Hence, motors 10 and 12 are selectively energized 80 percent of the time and the energizing currents supplied thereto are interrupted for only 20 percent of the time. It is, of course, recognized that the duration D may be adjusted to be any desired value. Similarly, the duration P of the positively poled pulses produced by clock means 30 may preferably be approximately 10 percent of the aforementioned duration D. Any desired duration of the positively poled pulses may be utilized to effect an accurate sampling of the back EMF components induced across the forward and reverse drive motors. To provide a typical numerical example, the repetition period T may be 5 milliseconds, duration D may be 1 millisecond and duration P may be 0.1 milliseconds. In this manner, the interval during which motor energizing current is interrupted is small enough such that the continued inertial operation of the motor is not significantly reduced by frictional components and by the load exerted thereon. Nevertheless, the interval of interruption is sufficient to permit the inductive kick component to be dissipated, as will be described hereinbelow, and to further permit an accurate sampling of the induced back EMF component. Furthermore, although the illustrated switch means have been described as being interposed in series circuits to thus determine the continuity of transmission channels, it is recognized that any suitable devices may be employed to effect an interruption in the supply of energizing currents to the drive motors and to enable a periodic sampling of the back EMF components induced thereacross. Hence, it is apparent that alternative embodiments are contemplated whereby amplifying means 18 might be periodically deactivated or amplifying means 20 and 24 might be periodically rendered inoperative. Also, since the described switch means are recognized as being responsive to pulses applied thereto by clock means 30 to assume their respective opened or closed states, it is manifest that the polarities of the applied pulses may be positive or negative, consistent with the operable responsiveness of the switch means. The exemplary pulse polarities are, therefore, not intended to be limiting and have been referenced merely for convenience of explanation.

It is recognized that motor 10, as well as motor 12, is operated on a time shared basis such that the motor is positively driven during a first interval of time and the back EMF thereof is sampled during a second interval of time. To permit the accurate sampling of the back EMF component, it is necessary to dissipate the energy stored in the motor windings, i.e., the IR voltage drop, and the $-L\,di/dt$ inductive kick component which are induced in response to the interruption of energizing current. It is recalled that the L/R time constant of the armature windings of a conventional motor is relatively high thereby dictating a correspondingly high relaxation time for the dissipation of such stored energy and inductive kick component. If duration D of the negatively poled pulses produced by clock means 30 is increased to accommodate this relatively high relaxation time, it is manifest that accurate control over the speed of the controlled motors must be forfeited. Therefore, in accordance with the present invention, apparatus is provided to decrease the effective relaxation time of the controlled motors to thereby dissipate the IR voltage drop and the inductive kick component at a rate that exceeds the intrinsic rate of decay of the motors. In a preferred embodiment of the instant invention, the improved apparatus may comprise forced relaxation amplifying means coupled to the controlled motor and adapted to operate in a first mode to supply an amplified DC energizing current to the motor and to operate in a second mode to decrease the effective relaxation time of the motor. Hence, such forced relaxation amplifying means may be substituted for the aforedescribed amplifying means 20 and 24 of FIG. 1.

FORCED RELAXATION CIRCUIT

Figure 2:
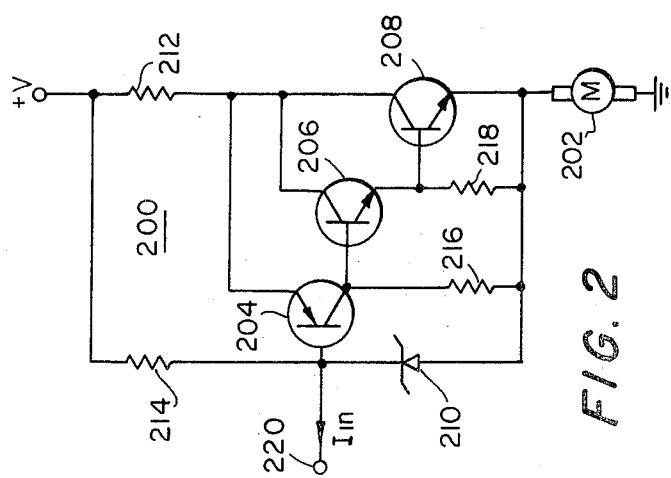
FIG. 2 is a schematic diagram of an exemplary embodiment of the forced relaxation circuit in accordance with the present invention, which embodiment may be advantageously utilized in the motor regulating system depicted in FIG. 1.

Referring now to FIG. 2, there is illustrated forced relaxation amplifying means 200 which may be readily substituted for each of amplifying means 20 and 24. The forced relaxation amplifying means 200 includes an input terminal 220 which may be coupled to switch means 26 and an output terminal which may be coupled to forward drive motor 10. A similar forced relaxation amplifying means may include an input terminal coupled to switch means 28 and an output terminal coupled to reverse drive motor 12. Since the forced relaxation amplifying means that may be coupled to drive motors 10 and 12 would be substantially identical, FIG. 2 illustrates a typical embodiment of such forced relaxation amplifying means coupled to a motor 202. It is manifest that motor 202 may thus comprise either forward drive motor 10 or reverse drive motor 12. The forced relaxation amplifying means 200 is comprised of threshold level detecting means and amplifying means. The amplifying means includes transistor means 204, 260 and 208. Transistor means 204 is here illustrated as a p-n-p transistor having a base electrode coupled to input terminal 220 and a collector electrode coupled via resistance means 216 to the output terminal of the forced relaxation amplifying means. Additionally, the emitter electrode of transistor means 204 is coupled to a suitable source of operating potential, such as +V via resistance means 212. The base electrode of the transistor means is further coupled to the source of operating potential by resistance means 214. One of ordinary skill in the transistor circuitry art will recognize that transistor means 204 is adapted to function as a conventional transistor amplifier and, additionally, may further function as a conventional transistor switch in accordance with the magnitude and polarity of the signal applied to the base electrode thereof.

Transistor means 206 and 208 are interconnected in a current amplification configuration whereby the collector electrodes thereof are connected in common relationship to the source of operating potential via resistance means 212. Additionally, transistor means 206, which is seen to be an emitter follower amplifier, includes an emitter electrode connected to the base electrode of transistor means 208. A resistance means 218 further couples the emitter electrode of transistor means 206 to the output terminal of forced relaxation amplifying means 200. Transistor means 208 is also seen to be an emitter follower amplifier whereby the emitter electrode thereof is coupled to the output terminal of the forced relaxation amplifying means. It is recognized that, if desired, the current amplification obtained by the interconnected emitter follower transistors may be similarly achieved by a single high gain emitter follower transistor. Transistor means 206 and 208 are complementary to transistor neans 204 and, therefore, may comprise conventional n-p-n transistors.

The threshold level detecting means included in forced relaxation amplifying means 200 is adapted to detect when a voltage induced in the armature windings of motor 202 exceeds a threshold level and, therefore, may comprise a conventional reference voltage generator. Hence, when the voltage across motor 202 exceeds the reference voltage level, an appropriate indication thereof is provided. As illustrated in FIG. 2, the reference voltage generator may comprise conventional zener diode 210 having a cathode thereof connected to the base electrode of transistor means 204 and an anode thereof connected to the output terminal of the forced relaxation amplifying means. As is recognized, a zener diode is capable of operating in the breakdown region thereof when the reverse biasing potential applied to the cathode exceeds a predetermined breakdown voltage. Current is permitted to flow through the reverse biased zener diode when the diode operates in its breakdown region.

In operation, the illustrated forced relaxation amplifying means 200 is capable of supplying a unidirectional direct current to motor 202 when a suitable signal is applied to input terminal 220. Thus, if motor 202 is to be driven by supplying a positive DC energizing current thereto, it is appreciated that a suitable positive signal applied to the input terminal, such as an amplified positive DC error signal supplied by amplifying means 18 or by inverting means 22, is amplified by transistor means 204. The amplified signal is coupled to the current amplifier comprised of transistor means 206 and 208 and a suitably positive DC energizing current flows from the current amplifier to the output terminal of the forced relaxation amplifying means and hence, to the armature of motor 202. As a consequence thereof, motor 202 is appropriately energized resulting in the rotation of the armature thereof.

Upon interrupting the signal applied to input terminal 220, the current amplifier is de-energized whereby transistor means 206 and 208 are deactivated and thus present an open circuit to motor 202. Upon interrupting the supply of energy to motor 202, the current flowing in the armature thereof starts to decay toward zero. Consequently, a very large inductive kick component equal to $-L\,di/dt$ is generated. The inductive kick component is sufficiently large to exceed the threshold level corresponding to the breakdown voltage of zener diode 210 thereby forcing the zener diode into its breakdown mode of operation.

As zener diode 210 begins to conduct current therethrough, the voltage thereacross is limited to the predetermined zener voltage whereby a sufficient base current is applied to transistor means 204. Consequently, transistor means 204 assumes its conducting state to operate as a switch to effectively energize transistor means 206 and transistor means 208. It is appreciated that when transistor means 208 is activated, the transistor means assumes its conducting state, and now provides a discharge path for the current stored in the armature inductance. It is recognized that the voltage appearing at the armature of motor 202 is limited to a predetermined maximum amount. This limited voltage is forced upon the inductive kick component $-L\ di/dt$, thereby constraining the inductive kick component to a predetermined maximum value. Since the inductive kick component cannot attain a greater magnitude, it may be observed that the potential hazards heretofore presented by a large inductive kick component, such as destruction of the solid state circuitry coupled to the motor, are here obviated. More significantly, the time now required for the constrained inductive kick component and the IR voltage drop caused by the current stored in the armature inductance to dissipate to an insignificant value is manifestly less than the time that would be required when conventional free-wheel diode techniques are employed, for example. Therefore, it is appreciated that the effective relaxation time of motor 202 is now decreased such that the inductive kick component appears to dissipate at a rate that exceeds the intrinsic rate of decay of motor 202. This, of course, obtains because of the forced conduction placed upon the armature in accordance with the novel forced relaxation amplifying means 200 illustrated and described herein.

When the IR voltage drop and inductive kick component are sufficiently dissipated to now fall below the threshold level established by the zener breakdown voltage of zener diode 210, current no longer flows through the zener diode. Consequently, the base current applied to transistor means 204 is removed to deactivate the transistor means to its cutoff state, whereupon the transistor means 206 and 208 are correspondingly deactivated. An open circuit is thus provided between the source of operating potential +V and the output terminal of the forced relaxation amplifying means 200. The voltage now provided at the output terminal of the forced relaxation amplifying means is a combination of the decaying IR voltage drop and inductive kick component, and the induced EMF component. As the decaying IR voltage drop and inductive kick component rapidly approach a zero value, the back EMF component may be sampled to thus produce an accurate measurement of the actual angular velocity of motor 202.

Therefore, it is seen that zener diode 210 operates as a conventional reverse biased rectifying diode when a suitable control signal is applied to input terminal 220; and operates as an electronic clamp when the threshold level established thereby is exceeded in response to the interruption of energizing current supplied to motor 202. Moreover, transistor means 204 functions as a conventional transistor amplifier when motor 202 is to be energized and as a switch to activate transistor means 206 and 208 when the threshold level established by zener diode 210 is exceeded. Furthermore, transistor means 206 and 208 operate as a conventional emitter follower amplifier to obtain sufficient current gain whereby motor 202 is adequately energized and further serve to limit the inductive kick component to a predetermined maximum when activated by the switch. It is here noted that zener diode 210 may be selected such that the threshold level established thereby is less than the maximum safe operating voltage of the active components. This is to insure that transistor means 204, 206 and 208 are not destroyed in the forced relaxation mode in response to the decaying motor current. Consequently, the inductive kick component is constrained to a predetermined maximum value to force the rapid relaxation of the motor current.

The foregoing description of forced relaxation amplifying means 200 has assumed particular polarities of voltages and currents and, therefore, zener diode 210 has been particularly poled and transistor means 204, 206 and 208 have been assumed to be of specific types. However, it is manifest that these assumptions are provided merely for the purpose of explanation to permit a facile understanding of the operation of the forced relaxation amplifying means and are not to be deemed as limiting the present invention thereto. Furthermore, since the forced relaxation amplifying means is capable of two modes of operation, it is readily understood that two independent circuits can be provided to perform said two modes of operation. Thus, amplifying means 20 and 24 of FIG. 1 may each comprise conventional current amplifiers; and forced relaxation means comprised of threshold level detecting means and voltage limiting means as described hereinabove, may be coupled as independent circuits to the armatures of each of drive motors 10 and 12. The forced relaxation means are thus seen to decrease the effective relaxation time of the motors, thereby rapidly forcing the motor current to relax when energizing signals thereto have been interrupted, but need not be employed to supply energizing currents to said motors. Such forced relaxation means may be disposed in the series circuit extending between forward drive motor 10 and sample and hold means 32 and in the series circuit extending between reverse drive motor 12 and sample and hold means 24, illustrated in FIG. 1.

IMPROVED MOTOR CONTROL SYSTEM

An exemplary embodiment of motor control apparatus with which the present invention finds ready application is illustrated in FIG. 3. The motor control apparatus there illustrated is employed to regulate the operation of forward drive motor 10 and reverse drive motor 12 which may be provided in a direct drive reel-to-reel tape transport system, for example. Although two electric motors are here depicted as being regulated, it is now readily apparent that the exemplary apparatus to be described is particularly adapted to control the speed of a single motor. The motor control apparatus is comprised of error signal generating means 16, amplifying means 302, motor driving means 200f and 200r, sample and hold means 32 and 34 and filter means 310 and 312. Those components identified by the reference numerals that identify corresponding elements illustrated in FIG. 1 are understood to be identical thereto and, therefore, in the interest of brevity, further description is not provided. Amplifying means 302 is coupled to error signal generating means 16 and is adapted to receive the error signal generated by the error signal generating means. Moreover, amplifying means 302 is a selectively responsive amplifier that is not responsive to an input signal supplied thereto when said input signal admits of a magnitude within a preselected range. This preselected range is known as a dead band and amplifying means 302 may be a conventional dead band amplifier. If this preselected range corresponds to a minimum amplitude that might be obtained by the error signal, it is apparent that the superposition of electrical noise and other disturbances to this minimum amplitude might result in an undesirable amplification thereof by a conventional amplifier. Thus, the use of a dead band amplifier forecloses the possibility of deleterious operation by being non-responsive to such minimum magnitude error signals.

Amplifying means 302 is coupled to driving means 200f via switch means 26 and to driving means 200r via switch means 28. It is recognized that, if desired, an inverting means, such as aforedescribed inverting means 22, may be interconnected between amplifying means 302 and driving means 200r. Driving means 200f may comprise the aforedescribed forced relaxation amplifying means 200, illustrated in FIG. 2, and is coupled to the armature of forward drive motor 10. Similarly, driving means 200r may comprise the forced relaxation amplifying means 200 and is coupled to the armature of reverse drive motor 12. The armature of forward drive motor 10 is further connected to sample and hold means 32 via switch means 38; and, similarly, the armature of reverse drive motor 12 is coupled to sample and hold means 34 via switch means 40. Sample and hold means 32 and 34 are coupled to error signal generating means 16 by filter means 310 and 312, respectively. The filter means may comprise conventional low-pass filtering devices to mitigate disturbances and abrupt changes in the voltage levels stored by the capacitors included in the sample and hold means. A further input terminal of error signal generating means 16 is coupled to input terminal 300 to receive a reference signal, such as that produced by aforedescribed reference generating means 14, or other "set point" signal representing a desired operation of the driven motors.

It has been found that when operation of the illustrated motor control apparatus is initiated it is preferred to rapidly accelerate the energized forward drive motor 10 or reverse drive motor 12 to rapidly attain a desired, or predetermined, operating speed. Because of the inertia exhibited by the motor together with the mechanical load thereon, maximum power is required by such motor during acceleration thereof. Thus, during the acceleration interval it is preferred to minimize the periodic interruptions in the supply thereto of energizing currents. This may be advantageously obtained merely by decreasing the percentage of time that switch means 26 and 28 are deactivated. Hence, if the duration D of the negatively poled pulses applied to the switch means is to be maintained, it is necessary to increase the repetition period $T_1$ and to thus decrease the frequency of the negatively poled pulses. Similarly, when it is desired to arrest the rotation of motors 10 and 12, maximum power thereto is again required. Thus, during intervals of deceleration to attain a braking of the motors, the repetition period $T_1$ should be increased to correspondingly decrease the pulse frequency. Adjustable frequency clock means 306 is provided to achieve the aforementioned variations in pulse frequency during acceleration and deceleration intervals. The adjustable frequency clock means 306 may comprise a conventional voltage controlled oscillating means capable of producing a pulse train admitting of a frequency inversely proportional to the magnitude of the signal supplied thereto. Thus, as the magnitude of the signal applied to adjustable frequency clock means 306 is increased, the repetition period $T_1$ of the negatively poled pulses produced thereby is similarly increased and switch means 26 and 28 thus remain closed for a greater percentage of time. The input terminal of adjustable frequency clock means 306 is coupled to error signal generating means 16 via conventional amplifying means 304. Since the aforedescribed relationship between the positively poled pulses applied to switch means 38 and 40 and the negatively poled pulses applied to switch means 26 and 28 should be preserved regardless of the variations in the repetition period $T_1$, sample clock means 308 is provided to appropriately shape the pulses generated by adjustable frequency clock means 306. Sample clock means 308 is coupled to the adjustable frequency clock means and includes an output terminal coupled in common relationship to switch means 38 and 40 in the now understood manner. Sample clock means 308 may comprise conventional shaping circuits such that negatively poled pulses admitting of duration D are shaped to positively poled pulses admitting of a duration P, wherein D is approximately 10 times as great as P. Alternatively, sample clock means 308 may be similar to and synchronized with adjustable frequency clock means 306 to produce positively poled pulses of duration P. In this configuration, the sample clock means may be coupled to amplifying means 304.

The operation of the exemplary motor control apparatus illustrated in FIG. 3 will now be described. It is initially assumed that forward drive motor 10 and reverse drive motor 12 are at rest. When a desired speed signal is applied to input terminal 300, error signal generating means 16 generates an error signal admitting of maximum amplitude proportional to said desired speed signal. The magnitude of the error signal is clearly without the preselected range, or dead band, associated with amplifying means 302. Hence, an amplified error signal is applied to driving means 200f and driving means 200r by switch means 26 and 28, respectively. It is further assumed that a positive error signal is capable of activating driving means 200f and a negative error signal is capable of activating driving means 200r. It is manifest that one of said driving means responds to the applied error signal in accordance with the polarity of said signal. In accordance with the example assumed hereinabove with respect to FIG. 1, foward drive motor 10 will be energized if a positive desired speed signal is applied to input terminal 300 and reverse drive motor 12 will be energized if a negative desired speed signal is applied to the input terminal. If the desired speed signal is here assumed to be a positive DC signal, for example, driving means 200f is activated to supply forward drive motor 10 with energizing current. It is, of course, recalled that, if desired, the selective activation of switch means 26 and 28 may determine the energization of motors 10 and 12, notwithstanding the polarity of the desired speed signal. Hence, in the instant example, switch means 26 may be closed to supply driving means 200f with an amplified error signal, whereby forward drive motor 10 is energized. Consequently, the armature of forward drive motor 10 commences the rotation thereof. Since maximum power is required to initiate the operation of the drive motor, it is preferred to minimize the interruption of energizing current supplied thereto. Consequently, the maximum amplitude error signal generated by error signal generating means 16 is further amplified by amplifying means 304 and applied to adjustable frequency clock means 306 whereat the repetition period $T_1$ is increased.

When a negatively poled pulse is generated by the adjustable frequency clock means 306 and applied to switch means 26 and 28, the respective switch means are deactivated and energizing current supplied to forward drive motor 10 is interrupted. Consequently, an IR voltage drop and an inductive kick component are induced across the armature of drive motor 10, which IR voltage drop and inductive kick component are rapidly dissipated by driving means 200f in a manner that is now readily understood. During a final portion of the pulse of duration D, for example during the final 10 percent of the pulse duration, a positively poled pulse admitting of duration P is supplied to switch means 38 and 40 by sample clock means 308. Sample and hold means 32 and 34 are thus activated to sample the back EMF component induced across the armatures of each of the forward drive motor 10 and reverse drive motor 12 and to store said sampled back EMF components. The voltages stored in sample and hold means 32 and 34 are appropriately filtered by filter means 310 and 312 and then applied to error signal generating means 16 whereat they are compared to the desired speed signal applied to input terminal 300.

It is appreciated that as forward drive motor 10 accelerates in the direction tending to attain an actual speed corresponding to a desired speed thereof, the magnitude of the error signal generated by error signal generating means 16 decreases. As the error signal decreases, adjustable frequency clock means 306 responds thereto to correspondingly decrease the repetition period $T_1$ resulting in an increase in the frequency of the negatively poled pulses produced thereby. The interruption in the energy supplied to forward drive motor 10 is now increased to provide more frequent sampling of the back EMF components induced across the drive motors. The increased sampling is preferred at this time because an accurate representation of the actual speed of the drive motor, which is obtained as a result of such increased sampling, is required to maintain proper control thereover as said actual speed approaches correspondence with the desired speed. Furthermore, as the operating speed of the drive motor rapidly approaches a desired speed thereof, the power requirements of said motor are significantly reduced. Therefore, although an improvement in accuracy of speed measurement is obtained with an accompanying loss in driving energy, such loss is here acceptable.

When the speed of forward drive motor 10 substantially conforms to a desired speed represented by the signal applied to input terminal 300, the error signal generated by error signal generating means 16 falls within the preselected range, or dead band, associated with amplifying means 302. Hence, the signal applied to driving means 200f is essentially zero and the driving means supplies forward drive motor 10 with an energizing current sufficient to maintain the present operating speed of the drive motor. Of course, should the actual speed of the drive motor deviate from the desired speed thereof, error signal generating means 16 generates an error signal without the dead band and an appropriate correction in operating speed is achieved.

The aforedescribed operation wherein forward drive motor 10 is energized is equally applicable to the operation wherein reverse drive motor 12 is energized. Thus, if reverse drive motor 12 is initially at rest, a maximum signal is generated by error signal generating means 16 proportional to the desired speed signal applied to input terminal 300. The error signal is amplified by amplifying means 302 and, in view of the polarity thereof or the selective activation of switch means 28, is now effective to activate driving means 200r. Operation of the reverse drive motor 12 is thus initiated by the supply of energizing current thereto from driving means 200r. Since the error signal now admits of maximum magnitude, adjustable frequency clock means 306 responds to the signal applied thereto by amplifying means 304 to cause the interruption of energizing current to be effected at a relatively low rate. Similarly, the back EMF components induced across the forward and reverse drive motors are sampled at a correspondingly low rate.

As the actual speed of reverse drive motor 12 approaches a desired speed thereof, the voltages stored in sample and hold means 32 and 34 and applied to error signal generating means 16 by filter means 310 and 312 conform in magnitude to the desired speed signal. Consequently, the error signal, which is proportional to the difference between the desired speed signal applied to terminal 300 and the voltages stored in sample and hold means 32 and 34, is reduced to effect a corresponding decrease in the repetition period of the pulses produced by adjustable frequency clock means 306. Consequently, the back EMF components induced across forward drive motor 10 and reverse drive motor 12 are sampled at a higher rate to more accurately represent the actual speeds of the drive motors. When the actual speed of reverse drive motor 12 substantially corresponds to a desired speed thereof, the error signal generated by error signal generating means 16 admits of a magnitude that falls within the preselected range, or dead band, of amplifying means 302. Consequently, the signal applied to driving means 200r is essentially zero and reverse drive motor 12 is supplied with an energizing current sufficient to maintain the present rotational speed thereof. It is, of course, appreciated that deviations in the actual speed of reverse drive motor 12 from a desired speed thereof are indicated by the amplitude of the error signal produced by error signal generating means 16 to effect a compensating correction in the operation of said reverse drive motor to thereby minimize the error signal.

If forward drive motor 10 has been energized, for example, and it is desired to arrest the rotation of the drive motors and to brake the motors to a stop, it is necessary to merely remove the desired speed signal from input terminal 300. As a consequence thereof, the error signal generated by error signal generating means 16 is proportional to the voltages stored in sample and hold means 32 and 34. The error signal admits of a maximum amplitude and, in view of the assumed polarity thereof, is effective to activate driving means 200r. Consequently, energizing current is supplied to reverse drive motor 12 to effect dynamic braking thereof, whereby the voltages stored in sample and hold means 32 and 34 are reduced until the generated error signal is within the preselected range, or dead band, of amplifying means 302. Once the decreasing error signal falls within the dead band, driving means 200r is no longer activated and, therefore, energizing current is no longer supplied to reverse drive motor 12. At this time the motors 10 and 12 operate very slowly such that frictional forces exerted on the forward drive motor 10, reverse drive motor 12 and the load mechanically coupled to the drive motors are sufficient to brake the motors to a stop. For example, if the illustrated motor control apparatus is employed in a direct drive reel-to-reel tape drive system, the frictional forces exerted upon the tape by, for example, the magnetic reading and writing apparatus, are sufficient to halt further movement of the tape. Similarly, if reverse drive motor 12 has been energized, the motor may be braked to a stop by terminating the desired speed signal applied to input terminal 300. The resulting error signal generated by error signal generating means 16 is proportional to the voltages stored in sample and hold means 32 and 34. Consequently, the error signal here admits of a maximum magnitude and of predetermined polarity to thereby activate driving means 200f. Energizing current is supplied to the forward drive motor 10 by driving means 200F to provide dynamic braking of the drive motor. As the velocity of motors 10 and 12 are reduced, the magnitude of the error signal falls within the preselected range, or dead band of amplifying means 302. Consequently, driving means 200f is deactivated and the attending frictional forces produce a final braking effect upon the motors.

In accordance with the foregoing description, it is now readily apparent that the exemplary motor control apparatus illustrated in FIG. 3 is effective to accurately control the operation of one or more motors. The speed of the controlled motor may be varied in any desired amount merely by appropriately varying the desired speed signal applied to input terminal 300. As maximum acceleration or deceleration is required, maximum power is applied to the controlled motor by increasing the repetition period $T_1$. Accordingly, an accompanying decrease in the rate at which the back EMF component is sampled is obtained. Conversely, when the actual speed of the motor approaches a desired speed thereof, the rate at which the back EMF component is sampled is increased resulting in a more accurate indication of the actual speed of the motor. This accurate indication of actual motor speed is employed to effect precise regulation thereover.

As the motor control apparatus illustrated in FIG. 3 is merely exemplary, it is manifest that one of ordinary skill in the art may effect various modifications and alterations in the depicted apparatus. Thus, the particular signal polarities and numerical examples set forth hereinabove are intended to be merely illustrative and should not be interpreted as limiting the disclosed apparatus thereto. For example, the duration D need not be limited solely to 1 millisecond but should be relatively small in comparison to the mechanical time constant exhibited by the controlled motor yet adequate to enable the inductive kick component to be dissipated and to permit an accurate sampling of the induced back EMF component. Also, repetition period $T_1$ should be large enough to provide the controlled motor with uninterrupted energizing current of sufficient duration to satisfy the particular power requirements of said motor but small enough to effect a sampling rate whereby an accurate indication of actual motor speed may be obtained.

While the invention has been particularly described with reference to motor control apparatus for use in a tape drive system, it will be obvious that this invention may be utilized with any motor control apparatus that serves to regulate the operation of one or more electric motors. Furthermore, the foregoing and various other changes and modifications in form and details may be made without departing from the spirit and scope of the invention. Thus, various inverting circuits or the like may be provided where necessary to invert the polarity of various signals that are generated throughout. It is further recognized that various components of the system illustrated in FIG. 1 may, if desired, be incorporated into the apparatus illustrated in FIG. 3. Consequently, if the exemplary motor control apparatus of FIG. 3 is to be employed in a tape drive system, for example, suitable components may be provided to effect substantial constant tape tension at the tape is transported from a supply reel to a take up reel. It is, therefore, intended that the appended claims be interpreted as including all contemplated changes and modifications.

What is claimed is:

1. In a motor control apparatus for regulating the speed of an electric motor, means for indicating the speed of said motor, comprising:
   means for producing a control signal determinative of the operating speed of said motor;
   amplifying means coupled to said means for producing a control signal for supplying an energizing current to said motor proportional to said control signal;
   interrupting means for periodically interrupting the supply of said energizing current to said motor;
   threshold level detecting means coupled to said motor for detecting when a component of the voltage induced in said motor in response to the interruption of energizing current exceeds a threshold level and for activating said amplifying means to supply a predetermined voltage to said motor during at least a portion of the interval of interruption to thereby limit the magnitude of said component of induced voltage; and
   sampling means coupled to said motor and operable during said interval of interruption and at a time subsequent to the activation of said amplifying means for sampling the back EMF component of said voltage induced in said motor in response to the interruption in the application of said control signal to said amplifying means.

2. Means for indicating the speed of an electric motor in accordance with claim 1 wherein said amplifying means comprises:
   a voltage source;
   a current amplifier interposed between said voltage source and said motor; and
   switch means for applying said control signal to said current amplifier and adapted to be activated in response to said threshold level detecting means for actuating said current amplifier to supply said predetermined voltage to said motor when said component of induced voltage exceeds said threshold level.

3. Means for indicating the speed of an electric motor in accordance with claim 2 wherein said threshold level detecting means comprises reference voltage generating means coupled to said motor for sensing when said induced voltage exceeds a reference voltage to thereby activate said switch means, and for sensing when said induced voltage is less than said reference voltage to deactivate said switch means.

4. Means for indicating the speed of an electric motor in accordance with claim 3 wherein said current amplifier comprises means for providing a discharge path for current stored in said motor when actuated by said switch means to thereby force said motor current to rapidly relax.

5. Means for indicating the speed of an electric motor in accordance with claim 4 wherein said current amplifier comprises first transistor means having a control electrode and having output electrodes disposed in series relation with said voltage source and said motor and said switch means comprises second transistor means having a control electrode and having output electrodes, said first and second transistor means being complementary, and wherein said control electrode of said first transistor means is coupled to an output electrode of said second transistor means and said control electrode of said second transistor means is coupled to said reference voltage means.

6. Means for indicating the speed of an electric motor in accordance with claim 5 wherein said interrupting means comprises timed switch means operable at an interrupting frequency and connected in series relation with said means for producing a control signal and said second transistor means control electrode.

7. Means for indicating the speed of an electric motor in accordance with claim 6 wherein said reference voltage means comprises a zener diode.

8. Apparatus for measuring the speed of a motor, comprising:
interrupting means for periodically interrupting the supply of energy to the armature of said motor whereby said armature continues to rotate during each interval of interruption as a function of the inertia thereof to induce a voltage in said armature comprised of a back EMF component proportional to the rotational speed of said armature and an inductive kick component in response to said interruption of energy;
means coupled to said armature and operable during each interval of interruption for forcing said inductive kick component and the IR voltage drop attributed to the current effectively stored in the armature, said means for forcing said inductive kick component and said IR voltage drop to decrease at a rate that exceeds the rate of decay intrinsic to said armature includes detecting means for detecting when said voltage induced in said armature exceeds a predetermined amount, and limiting means coupled to said armature and responsive to said detecting means for limiting said induced voltage to a predetermined maximum value windings of said motor to decrease at a rate that exceeds the rate of decay intrinsic to said armature; and
sampling means coupled to said armature for sampling said induced back EMF component during each interval of interruption and subsequent to the reduction of said inductive kick component and said IR voltage drop substantially to zero.

9. Apparatus in accordance with claim 8 wherein said limiting means comprises:
current amplifying means coupled to said armature; and
switch means coupled to said current amplifying means and responsive to said detecting means for activating said current amplifying means.

10. Apparatus in accordance with claim 9 wherein said current amplifying means and said switch means comprise first and second transistors, respectively, said first transistor assuming its conducting state to thereby apply a predetermined voltage to said armature in response to the assumption of the conducting state by said second transistor and said second transistor assuming its conducting state when said detecting means detects that said induced voltage exceeds said predetermined amount.

11. Apparatus in accordance with claim 10 wherein said detecting means comprises a zener diode adapted to supply a base current to said second transistor when said induced voltage exceeds said predetermined amount.

12. Motor control apparatus, comprising:
reference means for supplying a reference signal representing a desired motor speed;
means for applying operating energy to an electric motor as a function of an error signal, said operating energy being determinative of actual motor speed;
interrupting means coupled to said means for applying for periodically interrupting the application of operating energy to said motor, whereby an inductive kick component responsive to the interruption of operating energy and a back EMF component proportional to the actual speed of said motor are induced in said motor;
forced relaxation means coupled to said electric motor for sensing when said inductive kick component exceeds a predetermined value and for decreasing the effective relaxation time of said electric motor when said predetermined value is exceeded to dissipate the motor current inherently stored therein when operating energy had been applied thereto at a rate that exceeds the intrinsic rate of decay of said motor;
sampling means coupled to said electric motor and operable during said interval of interruption and at a time subsequent to the substantial dissipation of said motor current for sampling said back EMF component;
error signal generating means coupled to said reference means and said sampling means for generating an error signal proportional to the difference between said reference signal and said sampled back EMF component, said operating energy being a function of said error signal; and
variable timing means coupled to said error signal generating means and responsive to the magnitude of said error signal for establishing a frequency of interruption for said interrupting means and a sampling frequency for said sampling means.

13. Motor control apparatus in accordance with claim 12 wherein said means for applying operating energy to an electric motor comprises selectively responsive amplifying means coupled to said error signal generating means for amplifying said generated error signal, said selectively responsive amplifying means being nonresponsive to said error signal when said error signal admits of a magnitude within a preselected range.

14. Motor control apparatus in accordance with claim 12 wherein said variable timing means comprises adjustable frequency clock means coupled to said interrupting means and to said sampling means and inversely responsive to said error signal for supplying said interrupting means and said sampling means with clock signals having a frequency inversely proportional to the magnitude of said error signal.

15. Motor control apparatus in accordance with claim 12 wherein said forced relaxation means comprises:
threshold level detecting means coupled to said electric motor for detecting when said inductive kick component exceeds a threshold level; and
limiting means coupled to said electric motor and responsive to said threshold level detecting means for preventing said inductive kick component from exceeding a predetermined value.

16. Motor control apparatus in accordance with claim 15 wherein said limiting means comprises:
first transistor means having output electrodes connected in series relation with said electric motor and a voltage source and having a control electrode; and
second transistor means having an output electrode connected to said first transistor means control electrode and having a control electrode connected to said threshold level detecting means.

17. Motor control apparatus in accordance with claim 16 wherein said threshold level detecting means comprises a zener diode coupled to said voltage source and having a first electrode connected to said electric motor and a second electrode connected to said second transistor means control electrode.

18. In an electric motor regulating system including a feedback circuit wherein a signal representative of actual motor speed is compared with a signal representative of desired motor speed to derive a control signal adapted to be supplied to said motor and wherein said actual motor speed signal is proportional to the back EMF induced in said motor, the improvement comprising:
interrupting means for periodically interrupting the supply of said control signal to said motor whereby an inductive kick component responsive to the interruption of said control signal and a back EMF component responsive to the inertial operation of said motor are induced in said motor; and
forced relaxation amplifying means coupled to said motor and adapted to operate in a first mode for amplifying said control signal to apply said amplified control signal to said motor, and to operate in a second mode during each interval of interruption for decreasing the effective relaxation time of said motor to dissipate the motor current stored therein at a rate that exceeds the intrinsic rate of decay of said motor, said forced relaxation amplifying means includes an input terminal for receiving said control signal, an output terminal coupled to said motor, amplifying means interposed between said input terminal and said output terminal for unidirectionally amplifying said control signal, and threshold level detecting means connected in parallel relation with said amplifying means for detecting when said inductive kick component exceeds a threshold level to activate said amplifying means to said second mode of operation whereby said effective relaxation time of said motor is decreased.

19. The improvement of claim 18 wherein said amplifying means comprises:
first transistor means having output electrodes connected in series relation with said electric motor and a voltage source and having a control electrode; and
second transistor means having an output electrode connected to said first transistor means control electrode and having a control electrode connected to said input terminal.

20. The improvement of claim 19 wherein said first transistor means comprises n-p-n transistor means and said second transistor means comprises p-n-p transistor means.

21. The improvement of claim 19 wherein said threshold level detecting means comprises a zener diode.

22. A method of measuring the speed of an electric motor comprising the steps of:
supplying said electric motor with unidirectional energy having a magnitude determinative of the speed of said motor;
periodically interrupting said supply of unidirectional energy to said motor;
comparing a voltage induced across said motor during an interval of interruption to a reference level;

applying a reference voltage to said motor during a portion of the interval of interruption when said induced voltage exceeds said reference level to limit the $-L\,di/dt$ voltage induced across said motor; wherein L is equal to the inductance of the armature windings of said motor and $di/dt$ is equal to the rate of change of current flowing through said armature windings in response to the interruption of unidirectional energy supplied to said motor;
discharging the currents that had been stored in said motor during the supply of said reference voltage thereto; and
sampling during said interval of interruption and at a time subsequent to the limiting of said $-L\,di/dt$ voltage induced across said motor and subsequent to the discharge of stored current, the back EMF induced in said motor in response to the inertial rotation thereof.

23. The method of claim 22 wherein said steps of comparing and applying a reference voltage to said motor comprises the steps of:
detecting when said $-L\,di/dt$ voltage exceeds a threshold level; and
applying said reference voltage to said motor only when said $-L\,di/dt$ voltage exceeds said threshold level.

* * * * *